(12) United States Patent
Matsko et al.

(10) Patent No.: US 6,907,400 B1
(45) Date of Patent: Jun. 14, 2005

(54) PROMOTION APPARATUS AND METHOD

(75) Inventors: Michael J. Matsko, Lawrenceville, GA (US); Lew P. Nycz, Kinnelon, NJ (US)

(73) Assignee: NCR Corporation, Dayton, OH (US)

( * ) Notice: Subject to any disclaimer, the term of this patent is extended or adjusted under 35 U.S.C. 154(b) by 500 days.

(21) Appl. No.: 09/507,368

(22) Filed: Feb. 18, 2000

(51) Int. Cl.$^7$ .............................................. G06F 17/60
(52) U.S. Cl. ............................................................ 705/14
(58) Field of Search ........................................... 705/14

(56) References Cited

U.S. PATENT DOCUMENTS

| | | | | |
|---|---|---|---|---|
| 5,025,372 A | * | 6/1991 | Burton et al. ................. | 705/14 |
| 5,643,088 A | * | 7/1997 | Vaughn et al. ................ | 463/40 |
| 5,774,870 A | * | 6/1998 | Storey ......................... | 705/14 |
| 5,855,007 A | * | 12/1998 | Jovicic et al. ................ | 705/14 |
| 5,970,469 A | * | 10/1999 | Scroggie et al. ............. | 705/14 |
| 6,061,660 A | * | 5/2000 | Eggleston .................... | 705/14 |
| 6,196,920 B1 | * | 3/2001 | Spaur et al. .................. | 463/40 |

FOREIGN PATENT DOCUMENTS

JP        10328390 A  * 12/1998  ............ A63F/7/02

OTHER PUBLICATIONS

National Lottery Information Press Pack, website for http://www.national-lottery.co.uk, Apr. 28, 1999, specific web page address: http://web.archive.org/web/19980130021723/www.national-lottery.co.uk/inform/press.html.*

* cited by examiner

*Primary Examiner*—Jeffrey D. Carlson
*Assistant Examiner*—Arthur Duran
(74) *Attorney, Agent, or Firm*—Paul W. Martin; Priest & Goldstein, PLLC

(57) ABSTRACT

A promotion apparatus and method which builds customer loyalty. The promotion apparatus includes a computer, including a display for displaying information to a shopper and a recognition device for identifying the shopper and recording customer choices. The computer executes a game, identifies the shopper, establishes a first game situation for the shopper, generates a number of first results, generates a number of second results using the first game situation and the first results as inputs, generates a second game situation using the second results as input, and determines whether to issue an award to the shopper using the second results as input and only if the first game situation is a previous game situation from a previous play by the shopper.

31 Claims, 3 Drawing Sheets

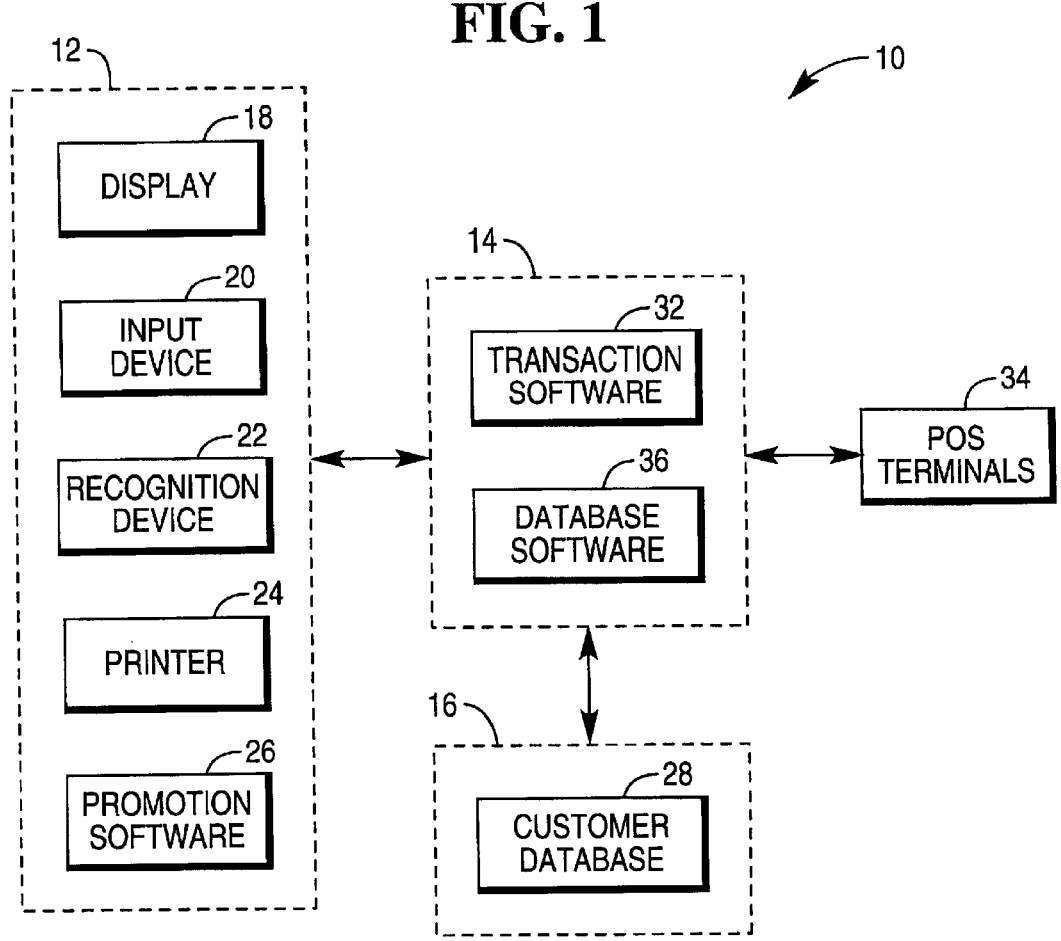

PROMOTION APPARATUS AND METHOD

BACKGROUND OF THE INVENTION

The present invention relates to games and other sweepstakes or contests for delivering special promotions, and more specifically to a promotion apparatus and method.

In order to entice customers to shop at their stores, retailers have often implemented promotions of various types. The most common type is the standard reduction in price of a desirable item. In order to keep the interest and loyalty of their customers, retailers have created more sophisticated promotions such as sweepstakes and games as a means to deliver a reward or prize to a customer. Typically, because fewer customers would actually win, the prizes would be bigger than the standard value of a price reduction and more excitement would be created.

Often, the implementation of these games was mechanical and not integrated with the point-of-sale (POS) application or terminal. Usually, if customers performed a qualifying act, such as buying a predetermined item, they would receive a paper game token. This token would indicate one of many possible results, such as an instant win/lose result, a discount on the next purchase of an item, or a sweepstakes form to be filled out by the customers and entered into a drawing. Alternatively, a game token would qualify the customer to a prize when a collection of corresponding results was completed and retained by the customer. Usually this would take the form of game tokens bearing a letter or word. A winning collection of tokens is achieved when two or more of the tokens form a target word or phrase. Because multiple visits were required to gain a winning collection, such a game would establish a form of continuity or loyalty to the retailer sponsoring the game.

There have been some attempts to implement these games in an electronic manner, often tied to frequent shopper programs, but the resulting games have been very simple. They tend to either take the form of an "instant win" where the customer immediately wins or loses or they take the form of a sweepstakes entry where an entry is made on behalf of the customer and the winner is randomly determined at a later date. In another example, multiple electronic game tokens have been generated and compared to form a simple "slot machine" type game. In this case, however, the reward was determined and given in a single visit.

Continuity or points programs in which a customer receives a reward after a predetermined number of qualifying acts, such as buying something or just visiting the store, are also common. The qualifying acts are often recorded mechanically on store-provided game cards that customers carry or they may be converted to simple point totals that are stored electronically, often on-line in a central customer database. Sometimes these programs may have multiple reward levels where the reward value increases as the customer reaches the multiple point accumulation thresholds. For example, if a customer spends $300 in the month of November then the customer may receive a free turkey at Thanksgiving. However, if the customer spends $500, the customer may be eligible to receive a free turkey plus all of the trimmings.

Despite their initial appeal, known game methods suffer from being too simple to hold a customer's interest long enough to be effective. Continuity or points programs suffer from many problems. Because customers can easily figure out what they have to do to earn a reward, they may view the reward as an "entitlement" rather than as a "bonus" given to them by the retailer. Over time, this may greatly diminish the effectiveness of the promotion. This type of promotion is also not effective with customers who know that they are unlikely to be able to attain the reward requirement thresholds. Since they are too simple to be "fun", they do not hold the attention of customers.

Therefore, it would be desirable to provide a promotion apparatus and method which enable a customer to play a game that is complex enough to hold their interest, but which is simple enough to play.

SUMMARY OF THE INVENTION

In accordance with the teachings of the present invention, a promotion apparatus and method are provided.

The promotion apparatus includes a computer, including a display for displaying information to a shopper and a recognition device for identifying the shopper and recording customer choices. The computer executes a game, identifies the shopper, establishes a first game situation for the shopper, generates a number of first results, generates a number of second results using the first game situation and the first results as inputs, generates a second game situation using the second results as input, and determines whether to issue an award to the shopper using the second results as input and only if the first game situation is a previous game situation from a previous play by the shopper.

The promotion method includes the steps of executing a game by a computer within a retail establishment, identifying the user by the computer, establishing a first game situation for a user by the computer, generating a number of first results by the computer, generating a number of second results by the computer using the first game situation and the first results as inputs, generating a second game situation by the computer using the second results as input, and determining whether to issue an award to the user using the second results as input and only if the first game situation is a previous game situation from a previous visit.

It is accordingly an object of the present invention to provide a promotion apparatus and method.

It is another object of the present invention to provide a promotion apparatus and method which hold a customer's attention.

It is another object of the present invention to provide a promotion apparatus and method which require multiple shopping visits.

It is another object of the present invention to provide a promotion apparatus and method which allow multiple valid game situations.

It is another object of the present invention to provide a promotion apparatus and method which provide more rewards than an "instant win" or a "reward whenever a number of "n" tokens have been collected".

It is another object of the present invention to provide a promotion apparatus and method in which the rules and rewards may vary for each visit.

It is another object of the present invention to provide a promotion apparatus and method in which all game situation data for a customer is stored electronically.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a block diagram of an in-store network, including the promotion apparatus of the present invention;

FIG. 2 is a diagrammatic view of a database for storing game information associated with customers.

DETAILED DESCRIPTION OF THE PREFERRED EMBODIMENT

Figure 3A:
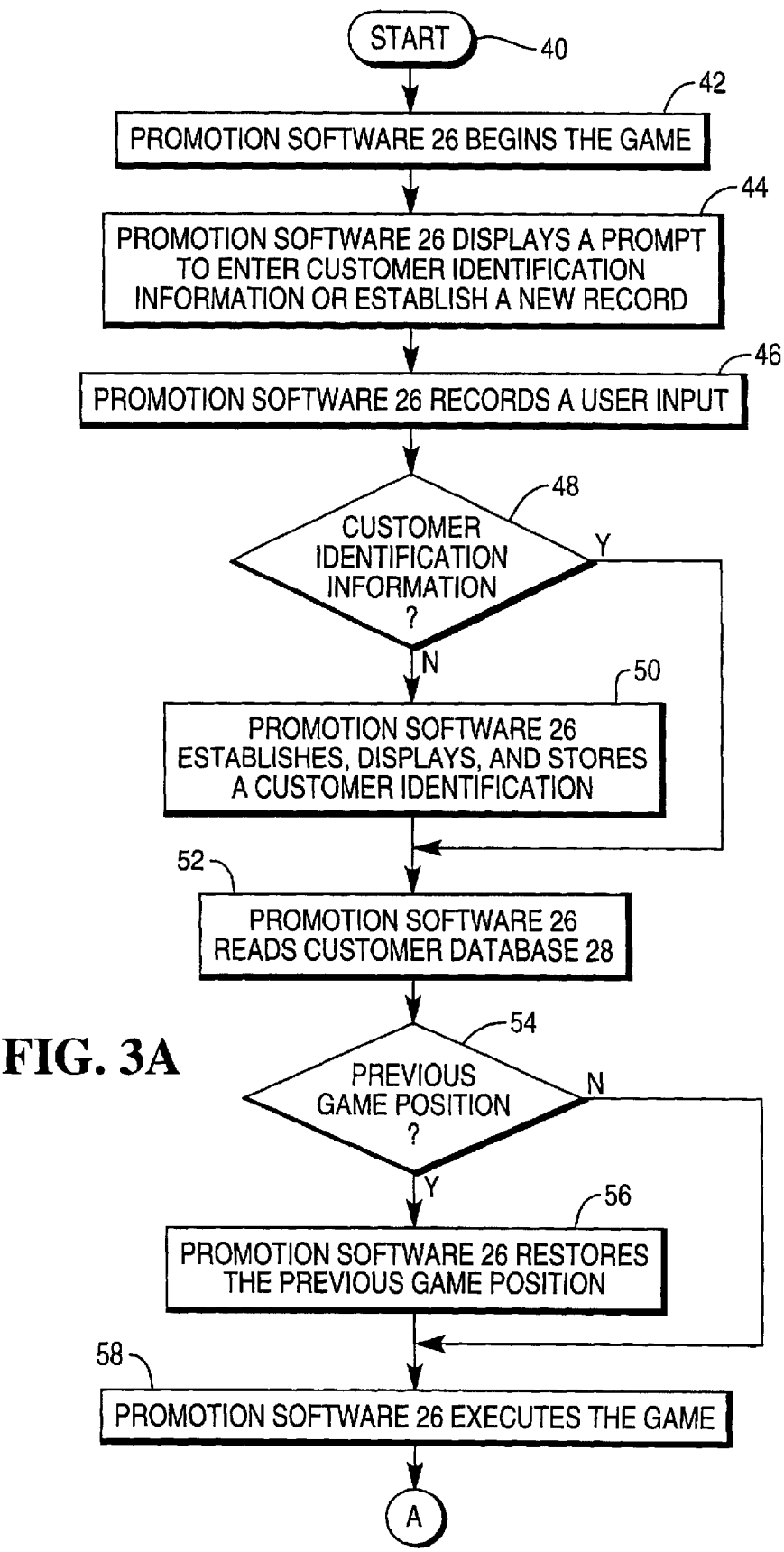
FIGS. 3A and 3B is a flow diagram illustrating the operation of the promotion software of the present invention.

Referring to FIG. 1, network 10 in a retail establishment is shown. Network 10 primarily includes customer terminal 12 and transaction server 14. Network 10 includes an appropriate communication interface for transferring data between terminal 12 and server 14. The communication interface may include any number of standard protocols, including the transmission control protocol/Internet protocol (TCP/IP).

Customer terminal 12 is preferably a kiosk or customer information display such as the NCR 7401 terminal. Terminal 12 may also be a point-of-sale (POS) terminal. Customer terminal 12 may be located anywhere in a transaction establishment, including at a checkout counter. A transaction establishment may include a plurality of terminals 12.

Customer terminal 12 executes promotion software 26 which provides entertainment to customers while promoting loyalty to the transaction establishment. Promotion software 26 includes algorithms for generating rewards based upon predetermined outcomes, with or without an element chance, from the entertainment. Promotion software 26 may be stored locally by terminal 12 or executed remotely from server 14. Alternatively, if terminal 12 is a "dumb" terminal, promotion software 26 may be executed by server 14. Promotion software 26 maintains customer entertainment information in customer database 28.

Customer terminal 12 primarily includes display 18 and input device 20, but may also include recognition device 22 and printer 24. Display 18 and input device 20 are preferably combined into a single touch screen device, but input device 20 may alternatively be a keyboard. Input device 20 may record an operator identity and/or start a game.

Recognition device 22 records customer identification information. Recognition device 22 may include a card reader which reads from a customer card, such as a "loyalty" card issued by the transaction establishment. Recognition device 22 may include other identification devices, such as biometric identification devices, a smart card reader, or an IR card reader. Alternatively, input device 20 may record customer identification information.

Printer 24 prints award information. Award information is preferably displayed as well, by display 18. If terminal 12 is kiosk or customer information display, award information may also be communicated to POS terminals 34 for inclusion into a corresponding customer's transaction.

Server 14 connects each terminal 12 to customer database 28. For this purpose, server 14 may execute database software 36 which works with network communication interfaces to transfer data to terminal applications. Server 14 may also execute transaction software 32 to provide price and other information to point-of-sale (POS) terminals 34. Server 14 may alternatively be a separate server from the transaction server.

Turning now to FIG. 2, customer database 28 is shown in more detail.

Customer database 28 contains a record for each customer who participates in the entertainment provided by promotion software 26. The records are indexed by customer identification (ID). Each customer record also includes a number n of entertainment situations (GSn). Entertainment situations include game status information. For example, if the game is a baseball game, the entertainment situations store the locations of the fielders, the player, the score, and other relevant information necessary to continue the game. Promotion software 26 determines award eligibility for each position. A customer must play more than once in order to achieve a winning game situation that results in a reward being issued. This differentiates the game from "instant win" type promotions. For typical players who play at most once or twice during a shopping visit, multiple shopping visits will typically be required to win.

Customer database 28 is preferably a centrally-located database, although individual databases may be maintained at different terminals 12.

Figure 3B:
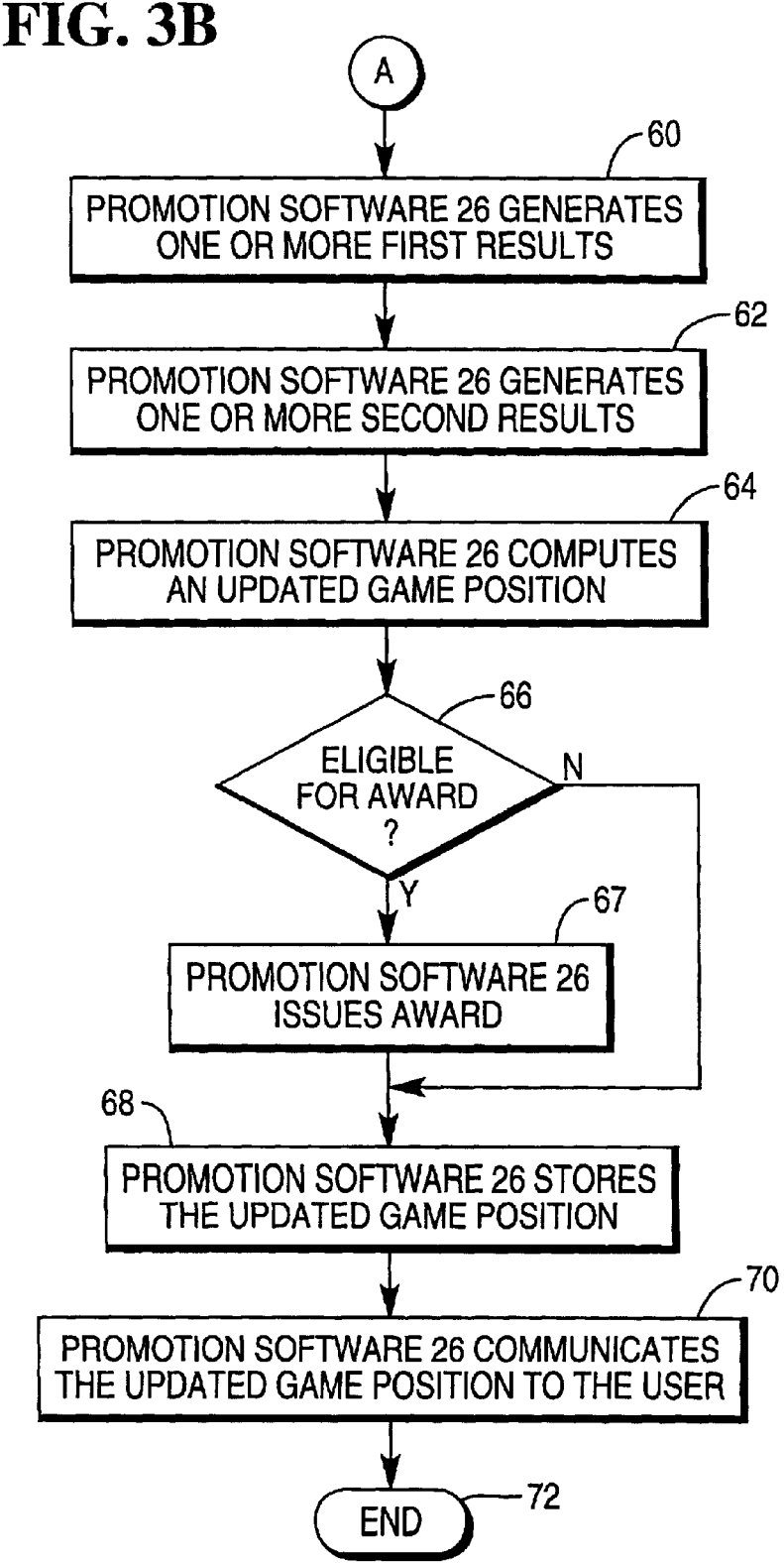

Turning now to FIGS. 3A and 3B, the method of the present invention is illustrated in detail beginning with START 40. The method is implemented during each time a customer initiates play. A goal of the present invention is to build loyalty by enticing customers to play more than once and make multiple shopping visits in order to play.

In step 42, promotion software 26 begins the game. Promotion software 26 may begin the game automatically. For example, promotion software 26 may automatically enter the user in a sweepstakes, possibly upon sensing a purchase event. Promotion software 26 may also manually begin the game recording a user choice.

In step 44, promotion software 26 displays a prompt to enter customer identification information or establish a new record.

In step 46, promotion software 26 records a user input. If a customer has previously used terminal 12, the customer enters customer identification information using input device 20 or recognition device 22. If a customer is a new use, then the customer responds in accordance with the prompt instructions.

In step 48, promotion software 26 determines whether the recorded input was customer identification information. If not, operation proceeds to step 50 to establish a new customer identification. If so, operation proceeds to step 52.

In step 50, promotion software 26 establishes a customer identification, displays the customer identification, and establishes a corresponding record in customer database 28.

In step 52, promotion software 26 reads customer database 28.

In step 54, promotion software 26 determines whether a previous game situation GS exists in the customer's record. If so, operation proceeds to step 56. If not, operation proceeds to step 58 where the user begins the game at a starting game situation, which may be randomly determined.

In step 56, promotion software 26 restores the previous game situation.

In step 58, promotion software 26 executes the game.

In step 60, promotion software 26 generates one or more first results. The first results are generated as elements of chance.

In step 62, promotion software 26 generates second results using the game situation and the first results as inputs.

In step 64, promotion software 26 computes an updated game situation using the second results as input. Two or more different game situations exist according to the "rules"

of the game. Promotion software 26 uses first programmable algorithms to compute the updated game situation. The updated game situation may represent any number of forward or backward steps. A backward step occurs when the second results are negative and a forward step occurs when the second results are positive. A user may regress farther from issuance of an award or lose the whole game and have to start over. Striking out, throwing an interception, or rolling a "seven" at the wrong time ("crapping out") are each significant events that contribute to the enjoyment and satisfaction of playing a game.

In step 66, promotion software 26 determines the user's eligibility for awards using the second results as input. Promotion software 26 uses second programmable algorithms. Alternatively, promotion software 26 may use a look-up table of results and awards.

If promotion software 26 determines that the user is eligible for an award, operation continues to step 67. Otherwise, operation proceeds to step 68.

In step 67, promotion software 26 issues the award. Awards may include money, free items, sweepstakes entries, loyalty program points, and services, such as home delivery. Furthermore, an award may include a special price or a privilege to buy something, such as an item in short supply. Sometimes customers do not win. A customer must play more than once in order to achieve a winning game situation that results in an award being issued. The game may be configured to require multiple shopping visits on different days before an award will be issued. A randomly generated starting position may be generated if the player loses and has to start over.

In step 68, promotion software 26 stores the updated game situation in customer database 28.

In step 70, promotion software 26 communicates the updated game situation to the user. Communication may be via display 18 or printer 24.

In step 72, promotion software 26 terminates the game. During a next play or visit, the user can continue the game at the updated game situation.

By way of illustration, the game may be an on-line baseball game. A result (i.e. single, double, triple, homerun, or out) from an "at bat" is randomly generated. Runners already on base from previous transactions advance or score based upon the result. Scoring a run generates a award. The batter either scores (i.e., home run), advances to a base, or is called "out". If the total number of outs has been updated to three, then all bases are cleared. A home run may be an instant win.

Other examples that could translate in a similar fashion include football simulations, horse/car racing simulations, and blackjack simulations.

There are a number of areas where this invention solves some common and recurring problems in the area of promotion, in general, and in frequent shopper programs in particular. Ease of participation for the customer encourages further participation and, thus, loyalty. On-line line updates of the customer record are more convenient for customers to manage than physical game cards or tokens. On-line and on-going games facilitate other forms of awards, such as game situation advancement, to replace standard monetary awards. The present invention avoids customer characterization of awards as entitlements, as often occurs in other promotion vehicles.

Although the invention has been described with particular reference to certain preferred embodiments thereof, variations and modifications of the present invention can be effected within the spirit and scope of the following claims.

We claim:

1. A promotion method comprising the steps of:
   (a) executing a game by a computer within a retail establishment;
   (b) identifying the user by the computer;
   (c) establishing a first game situation for a user by the computer;
   (d) generating a number of first results by the computer;
   (e) generating a number of second results by the computer using the first game situation and the first results as inputs;
   (f) generating a second game situation by the computer using the second results as input; and
   (g) determining whether to issue an award to the user using the second results as input only if the first game situation is a previous game situation from a previous play of the game by the shopper.

2. The method as recited in claim 1, wherein step (a) comprises the substeps of:
   (a-1) sensing a purchase by the user; and
   (a-2) automatically executing the game by the computer in response to sensing the purchase.

3. The method as recited in claim 1, wherein step (a) comprises the substeps of:
   (a-1) recording a user choice by an input device coupled to the computer; and
   (a-2) executing the game by the computer in response to the user choice.

4. The method as recited in claim 1, wherein step (a) comprises the substeps of:
   (a-1) sensing the presence of the user by a recognition device coupled to the computer; and
   (a-2) executing the game by the computer in response to the user choice.

5. The method as recited in claim 1, wherein step (b) comprises the substep of:
   (b-1) recording user identification information by an input device coupled to the computer.

6. The method as recited in claim 1, wherein step (b) comprises the substep of:
   (b-1) recording user identification information by a recognition device coupled to the computer.

7. The method as recited in claim 1, wherein step (b) comprises the substeps of:
   (b-1) determining whether a user record exists; and
   (c-2) if the user record does not exist, creating a new user record by the computer.

8. The method as recited in claim 1, wherein step (c) comprises,the substeps of:
   (c-1) determining whether the previous game situation exists; and
   (c-2) if the previous game situation exists, retrieving the previous game situation and using the previous game situation as the first game situation by the computer; but if the previous game situation does not exist, establishing a starting game situation as the first game situation by the computer.

9. The method as recited in claim 8, wherein step (c-2) comprises the substeps of:
   (c-2-A) if the previous game situation does not exist, randomly determining the starting game situation by the computer.

10. The method as recited in claim 1, wherein step (d) comprises the substep of:
(d-1) generating the first results as elements of chance.

11. The method as recited in claim 1, wherein step (e) comprises the substep of:
(e-1) generating a number of second results using programmable algorithms by the computer.

12. The method as recited in claim 1, wherein step (f) comprises the substep of:
(f-1) generating the second game situation using programmable algorithms.

13. The method as recited in claim 1, wherein step (f) comprises the substeps of:
(f-1) determining a number of forward or backward steps; and
(f-2) determining the second game situation from the number.

14. The method as recited in claim 1, wherein step (f) comprises the substeps of:
(f-1) determining that the second results represented a loss; and
(f-2) setting the second game situation to a starting game situation.

15. The method as recited in claim 14, wherein step (f-2) comprises the substep of:
(f-2-A) randomly generating the second game situation.

16. The method as recited in claim 1, wherein step (f) comprises the substeps of:
(f-1) determining that the second results represented a loss; and
(f-2) setting the second game situation to a starting game situation.

17. The method as recited in claim 1, wherein step (g) comprises the substeps of:
(g-1) determining eligibility for awards using programmable algorithms.

18. The method as recited in claim 1, wherein step (g) comprises the substep of:
(g-1) issuing an award to the user only if the first game situation is a previous game situation from a previous day.

19. The method as recited in claim 1, further comprising the step of:
(h) issuing the award by the computer.

20. The method as recited in claim 19, wherein step (h) comprises the substep of:
(h-1) issuing the award as a monetary award by the computer.

21. The method as recited in claim 19, wherein step (h) comprises the substep of:
(h-1) issuing the award as a free item by the computer.

22. The method as recited in claim 19, wherein step (h) comprises the substep of:
(h-1) issuing the award as a sweepstakes entry by the computer.

23. The method as recited in claim 19, wherein step (h) comprises the substep of:
(h-1) issuing the award as loyalty program points by the computer.

24. The method as recited in claim 19, wherein step (h) comprises the substep of:
(h-1) issuing the award as a free service by the computer.

25. The method as recited in claim 19, wherein step (h) comprises the substep of:
(h-1) issuing the award as a special price by the computer.

26. The method as recited in claim 19, wherein step (h) comprises the substep of:
(h-1) issuing the award as a privilege to buy a predetermined item by the computer.

27. The method as recited in claim 1, further comprising the step of:
(h) storing the second game situation by the computer.

28. The method as recited in claim 26, wherein step (h) comprises the substep of:
(h-1) storing the second game situation in a central database by the computer.

29. The method as recited in claim 26, wherein step (h) comprises the substep of:
(h-1) storing the second game situation in a local database by the computer.

30. A promotion apparatus for a retail establishment comprising:
a computer, including a display for displaying information to a shopper and a recognition device for identifying the shopper;
wherein the computer executes a game, identifies the shopper, establishes a first game situation for the shopper, generates a number of first results, generates a number of second results using the first game situation and the first results as inputs, generates a second game situation using the second results as input, and determines whether to issue an award to the shopper using the second results as input only if the first game situation is a previous game situation from a previous visit by the shopper.

31. A promotion method comprising the steps of:
(a) executing a game by a computer within a retail establishment;
(b) identifying a customer by the computer during a first visit at a first time to the retail establishment by the customer;
(c) establishing a first game situation for a user by the computer;
(d) generating a number of first results by the computer;
(e) generating a number of second results by the computer using the first game situation and the first results as inputs during a second visit at a second time to the retail establishment by the customer, wherein said second visit occurs at a later point in time than the first visit;
(f) generating a second game situation by the computer using the second results as input; and
(g) determining whether to issue an award to the user using the second results as input only if the first game situation is a previous game situation from a previous play of the game by the shopper.

* * * * *